No. 829,519. PATENTED AUG. 28, 1906.
E. FOWLER.
DISK SHARPENING ATTACHMENT FOR AGRICULTURAL MACHINES.
APPLICATION FILED MAR. 29, 1906.
2 SHEETS—SHEET 1.
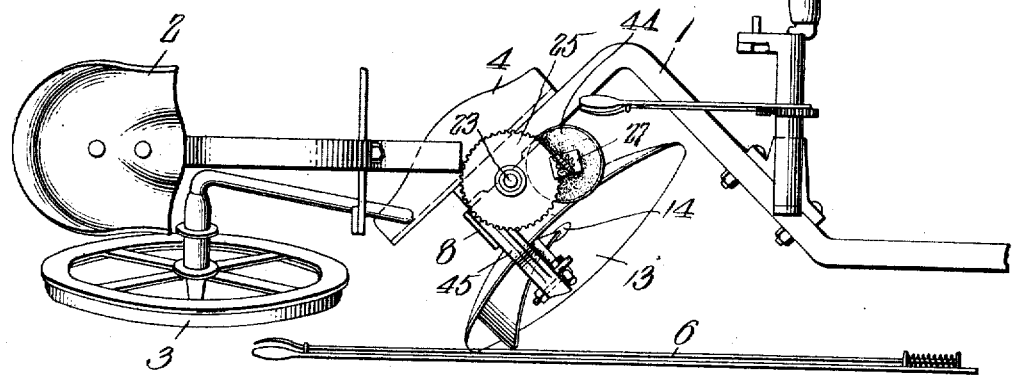
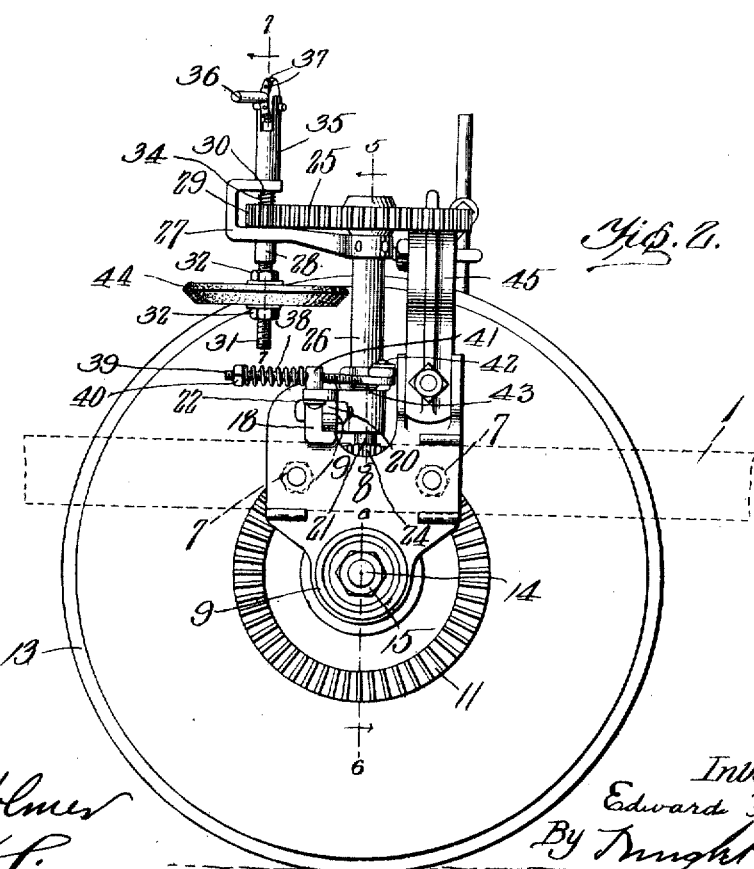
Witnesses
O. W. Holmes
H. H. Simms
Inventor
Edward Fowler
By Knight Bros
Attorneys
THE NORRIS PETERS CO., WASHINGTON, D. C.

No. 829,519. PATENTED AUG. 28, 1906.
E. FOWLER.
DISK SHARPENING ATTACHMENT FOR AGRICULTURAL MACHINES.
APPLICATION FILED MAR. 29, 1906.
2 SHEETS—SHEET 2.
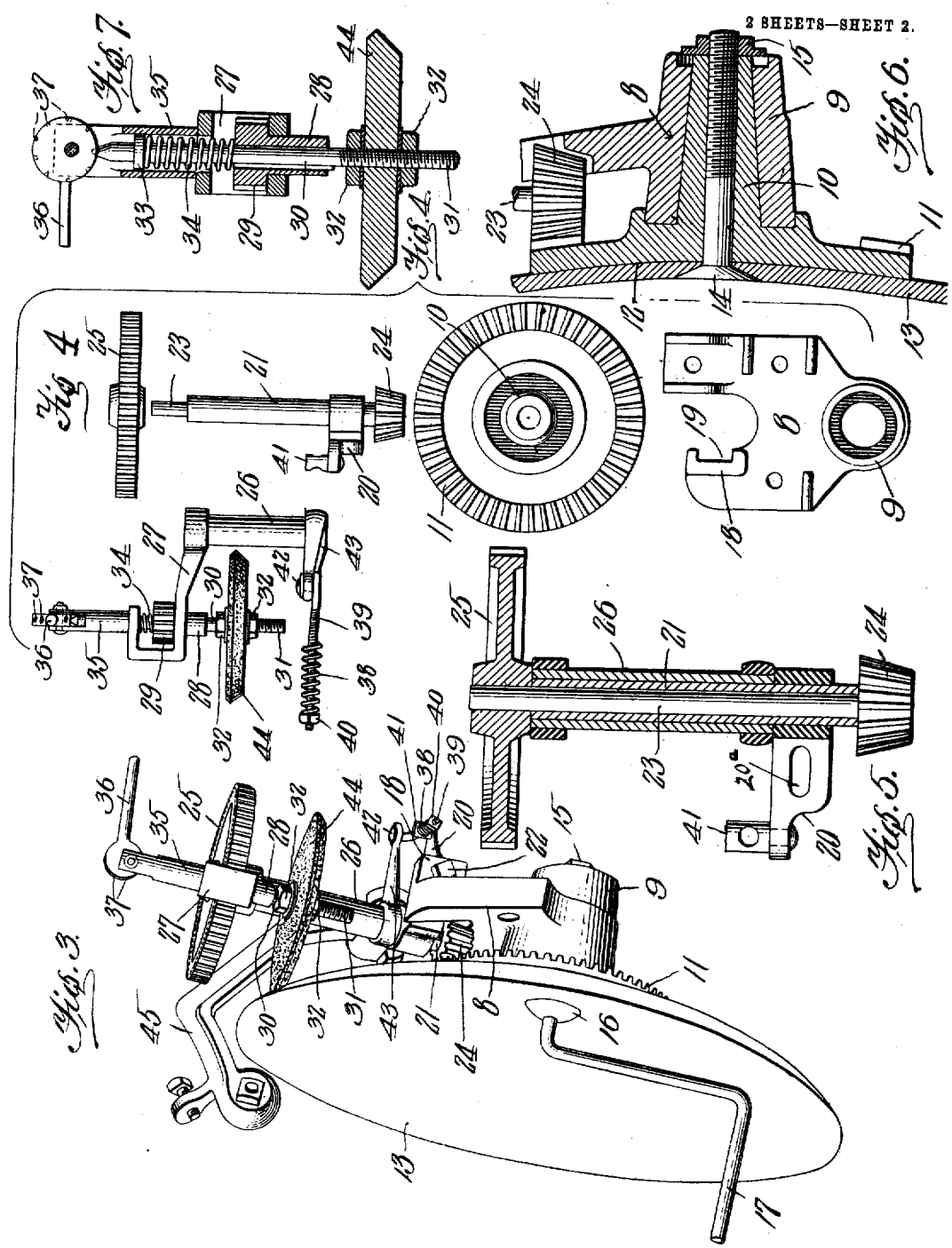
Witnesses
O. W. Holmes
H. H. Simms
Inventor
Edward Fowler
By Knight Bros
Attorneys

UNITED STATES PATENT OFFICE.

EDWARD FOWLER, OF CEDAR GROVE, GEORGIA.

DISK-SHARPENING ATTACHMENT FOR AGRICULTURAL MACHINES.

No. 829,519.                Specification of Letters Patent.                Patented Aug. 28, 1906.

Application filed March 29, 1906. Serial No. 308,730.

*To all whom it may concern:*

Be it known that I, EDWARD FOWLER, a citizen of the United States, residing at Cedar Grove, in the county of Walker, State of Georgia, have invented certain new and useful Improvements in Disk-Sharpening Attachments for Agricultural Machines, of which the following is a specification.

This invention relates to disk-sharpening attachments for agricultural machines—such as disk plows, disk harrows, and the like—and more particularly to a sharpening attachment which operates during the use of the machine.

An object of the invention is to provide a mechanism which is supported upon the mounting by which the disk is secured to the machine-frame.

A further object is to drive the mechanism from the disk.

Still another object is to improve disk-sharpening mechanisms.

Other and further objects will appear in the following description and will be more particularly pointed out in appended claims.

In the drawings, Figure 1 is a top plan of a portion of a disk plow to which my invention is applied. Fig. 2 is a rear elevation of my invention. Fig. 3 is a perspective view showing a means for rotating the disk when removed from the plow. Fig. 4 is a detail detached view of some of the parts of my invention. Fig. 5 is a section on line 5 5, Fig. 2. Fig. 6 is a section on line 6 6, Fig. 2, and Fig. 7 is a section on line 7 7, Fig. 2.

I herein illustrate and describe my invention as applied to a disk plow, such as described in my application, filed August 2, 1903, Serial No. 272,382; but it is to be understood that the same may be adapted for all kinds of disk agricultural machines or that the mechanism may be employed independently of any agricultural machine.

Referring particularly to the drawings, 1 indicates the plow-beam; 2, the seat; 3, the rear furrow-wheel; 4, the mounting for the rear furrow-wheel and the seat; 5, the unplowed-land wheel, and 6 the lever for adjusting the front furrow-wheel. (Not shown.

To the beam 1 is secured by bolts 7 the disk-mounting 8, which is provided with a journal-bearing 9, in which turns a bored tapering spindle 10, forming part of a casting which includes a bevel-gear 11, the front face of the casting being concaved at 12 to receive a concave disk 13. The disk is secured to the casting by an ordinary bolt 14 with nut and washer 15 or by a bolt 16, having a crank-handle 17 integral therewith, as shown in Fig. 3, or secured thereto in any other suitable manner, and by which the disk may be rotated and sharpened when the machine is not in operation.

The disk-mounting 8 is further provided with a lug 18, having a perforation or bolt-opening, said mounting and its lug being provided with a guide-groove 19, in which works an offset portion 20 on a shaft-sleeve 21, the offset portion being clamped to the mounting by a bolt 22, which passes through the perforation in lug 18 and the slot 20ª in the offset portion, the purpose of the slot 20ª being to permit the shaft-casing to be moved toward the disk for a purpose to be hereinafter described.

The shaft-casing 21 has mounted therein a shaft 23, having at its lower end a bevel-gear 24 and at its upper end a gear 25, the said shaft being arranged radial to the disk, so that the bevel-gear 24 may mesh with the bevel-gear 11. The shaft-casing 21 is movable toward the disk to permit the gear 11 to mesh with gear 24 when said gears become worn.

Swinging about the axis of the gear 25 is an oscillatory frame which comprises a sleeve 26 and a J-shaped member 27, in the longer arm of which is journaled a sleeve 28, having a pinion 29 arranged between the two arms. Keyed in this sleeve 28, so as to move axially therethrough and projecting from both sides of the J-shaped member, is a shaft 30. The lower end of shaft 30 is provided with screw-threads 31 and carries an emery-disk 44 or other abrasive device, the disk being held between a pair of nuts 32, which permit the disk to be adjusted on the shaft. The upper end of the shaft 30 is provided with an annular flange 33, and between this flange and the upper face of the pinion 29 is a helical spring 34, which tends to hold the emery-wheel above the edge of the cutting-disk 13.

Secured to the member 27 and surrounding the upper end of the shaft 30 is a tubular housing 35, which is bifurcated at its upper end and has a cam-lever 36 pivoted in the bifurcation. The cam-lever 36 is provided with a plurality of depressions or recesses 37 on its periphery, into any of which recesses the pointed upper end of the shaft 30 is adapted to enter. When the cam-lever is turned in one direction, it permits the shaft 30 to move axially and away from the disk edge under the action of spring 34, and when turned in the other direction the cam-lever forces the shaft toward the cutting edge and against the action of the spring. It is possible by this lever to sharpen a disk after it has become worn and when the diameter is less than a new disk. It is also possible to throw the emery-wheel or abrasive device out of action.

To hold the emery-wheel yieldingly against the disk, I provide a helical spring 38, which surrounds a slide-rod 39 and abuts a tension-nut 40 on the rod, and a perforated lug 41, swiveled on the offset portion 20 of the shaft-sleeve 21. The rod 39 works loosely through the lug 41 and is pivoted at 42 to a lateral arm 43 on the sleeve 26 of the oscillatory frame.

It will be noted that all of the sharpening mechanism is carried entirely by the disk-mounting, making it possible to construct a sharpening mechanism adapted for any make of machine. Further, the rotation of the abrasive device is positive and is geared directly to the disk.

When the disk rotates, the bevel-gear 11 transmits motion to shaft 23 through gear 24, shaft 23 transmits motion to sleeve 28 through gear 25 and pinion 29, and the sleeve transmits its motion to the emery-disk 44 to rotate the latter so that it rotates in a direction opposed to the direction of rotation of the cutting-disk.

The disk-mounting also has secured to it a scraper-arm 45, which carries the usual scraper 46. The scraper is so disposed as not to interfere with the operation of the sharpening mechanism.

Having thus described my invention, what I claim, and desire to secure by Letters Patent, is—

1. The combination with a disk-mounting constructed to be secured to a plow-beam, and a rotary disk carried thereby, of a rotary sharpening device carried by the mounting and geared to the disk to be rotated.

2. The combination with a disk-mounting and a rotary abrasive member carried by the mounting, of means for securing the disk to the mounting, comprising a bored spindle, a gear-wheel turning with the spindle and geared to the rotary abrasive member, and a bolt passing through the spindle and holding the disk thereto.

3. The combination with a disk-mounting and a rotary abrasive member carried by the mounting, of a disk, a disk-spindle journaled in the housing, a gear-wheel secured to the spindle to turn therewith, and connection between the gear-wheel and the rotary abrasive member to cause the member to rotate with the disk.

4. The combination with a mounting constructed to be secured to a plow-beam and a rotary abrasive member, of a casting embodying a gear-wheel and disk-spindle journaled in the mounting, a disk carried by the spindle, and connection between the abrasive member and the gear-wheel.

5. The combination with a mounting constructed to be secured to a plow-beam, a disk-spindle journaled in the mounting and a disk carried by the spindle, of an oscillatory frame carried by the mounting, a rotary abrasive member carried by the frame, and means acting on the oscillatory frame to yieldingly hold the abrasive member against the disk.

6. The combination with a mounting and a disk-spindle, of a shaft radiating from the spindle and geared thereto, a gear secured to the shaft, a frame swinging about the shaft, a pinion carried by the frame and meshing with the gear, an abrasive member rotating with the pinion, and a spring acting on the swinging frame to hold it yieldingly against a disk on the disk-spindle.

7. The combination with a mounting and a disk-spindle, of a shaft radiating from the spindle and geared thereto, a gear secured to the shaft, a swinging frame comprising a sleeve turning on the shaft and a J-shaped member, a pinion carried by the J-shaped member and meshing with the gear, an abrasive member turning with the pinion, and means acting on the frame to hold the abrasive member against the disk.

8. The combination with a mounting constructed to be attached to a plow-beam and a disk-spindle carried by the mounting, of an oscillatory or swinging frame carried by the mounting, an abrasive member carried by the frame and geared to the disk-spindle, and means yieldingly holding the abrasive member against a disk carried by the spindle.

9. The combination with a mounting and a disk-spindle, of an oscillatory or swinging frame, an abrasive member carried by the frame and geared to the disk-spindle, means yieldingly holding the abrasive member against a disk carried by the spindle, comprising a rod pivoted to the swinging frame, a perforated stud swiveled to the disk-mounting and through which the rod works, and a helical spring surrounding the rod and abutting the stud.

10. The combination with a mounting and a disk-spindle, of a gear turning with the spindle, an abrasive member, a radiating shaft to connect the abrasive member and the gear on the spindle, and means securing said shaft to the mounting, said means being adjustable to permit the shaft to be moved to and from the gear.

11. The combination of the disk-mounting provided with a guide and a bolt-opening extending through the guide, a disk-spindle journaled in the mounting, a bevel-gear carried by the spindle, an abrasive device, a shaft connecting the abrasive device and the bevel-gear, a pinion carried by the shaft to mesh with the gear, and means connecting the shaft to the mounting, slidable on the guide and comprising a part provided with a slot and a bolt passing through the slot and the bolt-opening in the mounting.

12. In a means for sharpening disks, the combination with a cutting-disk spindle, of a rotary abrasive disk geared to the spindle, a longitudinally-movable shaft to which the abrasive disk is secured, a spring tending to move the shaft in one direction, and means for moving it in the other direction against the action of the spring.

13. In a means for sharpening disks, the combination with a cutting-disk spindle, of a rotary abrasive disk geared to the spindle, a longitudinally-movable shaft to which the abrasive disk is secured, a spring tending to move the shaft in one direction, and a cam-lever for moving the shaft against the action of the spring.

14. In a means for sharpening disks, the combination with a cutting-disk spindle, of a rotary abrasive disk geared to the spindle, a longitudinally-movable shaft to which the abrasive disk is secured, a spring tending to move the shaft in one direction, and a cam-lever for moving the shaft against the action of the spring, said lever being provided with recesses in its periphery.

15. The combination with a mounting, of a disk-spindle journaled in the mounting, a rotary abrasive member arranged to act on a disk carried by said spindle, a longitudinally-movable shaft by which the abrasive member is carried, a gear keyed to the shaft and permitting the axial movement thereof, means for rotating the gear, a flange on the shaft, a helical spring bearing against the flange to hold it in one direction, and a cam-lever to move the shaft in the other direction.

16. The combination with the disk-spindle, of a rotary abrasive member to act upon a disk carried by the spindle, means for effecting a movement of the member along its axis of rotation, a swinging frame on which the abrasive member is movable axially, and means acting on the frame for holding the abrasive member yieldingly against the disk.

17. The combination of a casting having a bored spindle, a convex face and a bevel-gear, and a sharpening mechanism geared to the gear and arranged to act on a disk carried by said casting.

EDWARD FOWLER.

In presence of—
CHALLY BELL,
OLIVER HENSON.